Figure 1:
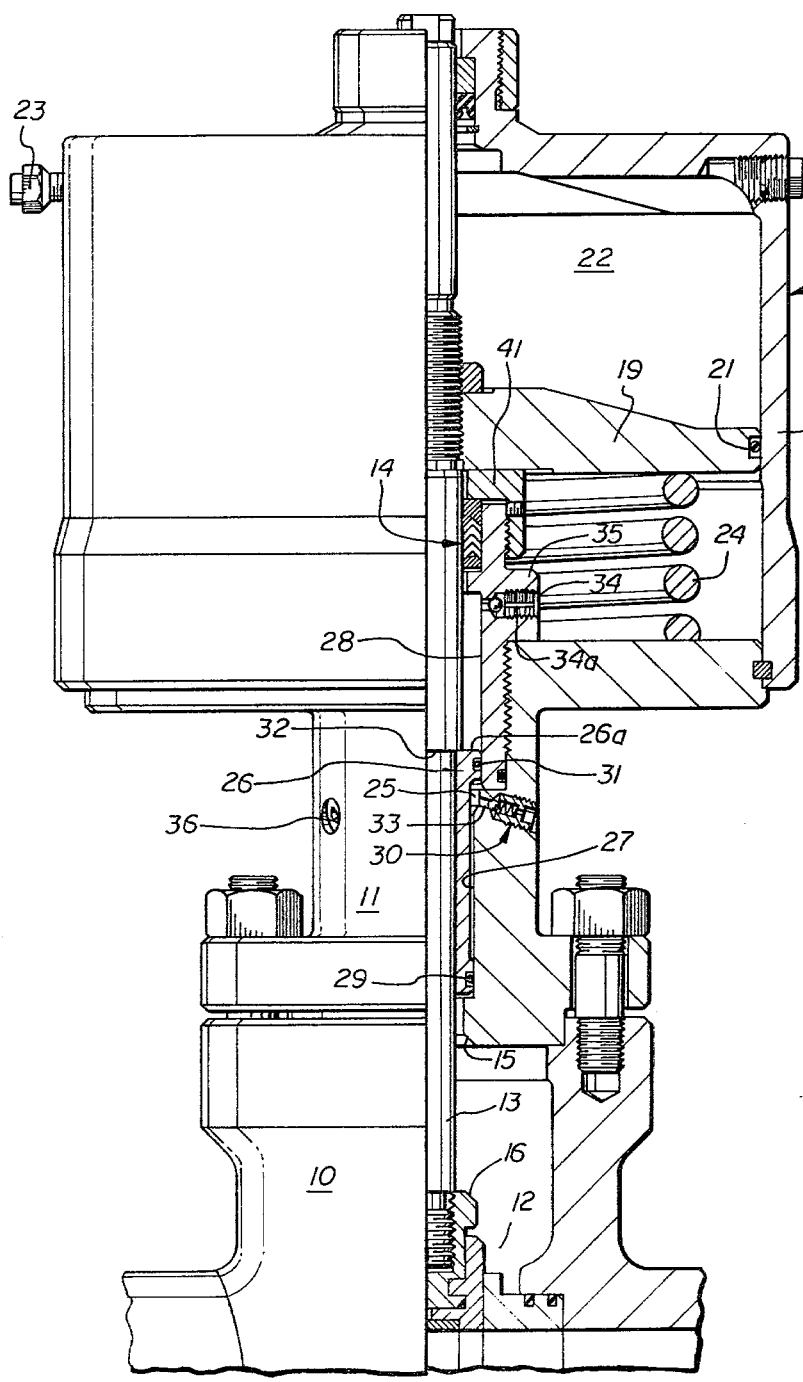

United States Patent [19]

Tunstall et al.

[11] 4,274,432
[45] Jun. 23, 1981

[54] VALVE

[75] Inventors: Karl N. Tunstall, Farmers Branch; M. L. Warren, Carrollton, both of Tex.

[73] Assignee: Otis Engineering Corporation, Dallas, Tex.

[21] Appl. No.: 113,731

[22] Filed: Jan. 21, 1980

[51] Int. Cl.³ ............................................. F16K 43/00
[52] U.S. Cl. .................................. 137/315; 251/214; 251/330; 251/63.6
[58] Field of Search ........................ 251/62, 63.5, 63.6, 251/63, 282, 330, 214, 326, 327; 137/246.12, 315

[56] References Cited

U.S. PATENT DOCUMENTS

| | | | |
|---|---|---|---|
| 2,011,087 | 8/1935 | Sherman | 251/330 |
| 2,780,233 | 2/1957 | Volpin | 137/315 |
| 3,096,070 | 7/1963 | Wolfensperger | 251/214 |
| 3,348,567 | 10/1967 | Volpin | 137/246.12 |
| 3,765,642 | 10/1973 | Nelson | 251/282 |
| 3,770,247 | 11/1973 | Nelson | 251/282 |
| 3,958,592 | 5/1976 | Wells et al. | 137/246.22 |
| 4,029,294 | 6/1977 | McCaskill et al. | 137/246.12 |
| 4,149,558 | 4/1979 | McGee et al. | 251/330 |
| 4,230,299 | 10/1980 | Pierce, Jr. | 137/315 |

OTHER PUBLICATIONS

Composite Catalog of Oil Field Equipment and Services, 33rd Revision, 1978–1979, p. 5331.

*Primary Examiner*—Martin P. Schwadron
*Assistant Examiner*—G. L. Walton
*Attorney, Agent, or Firm*—Vinson & Elkins

[57] ABSTRACT

A valve having a valve stem extending through a bonnet with packing therebetween and a back seat and back seat valve member cooperable to isolate the packing from pressure within the valve body wherein an auxiliary piston is provided to positively hold the back seat valve member on the back seat under the influence of pressure other than the pressure within the valve body. The back seat valve may be actuated by auxiliary pressure while changing the bonnet packing and may also serve to positively close the valve in the case of a malfunction of the usual closing mechanism.

6 Claims, 2 Drawing Figures

U.S. Patent   Jun. 23, 1981   4,274,432

VALVE

BRIEF DESCRIPTION OF THE INVENTION

This invention relates to valves and more particularly to valves having back seats to permit change of stem packing while the valve is installed in line.

In the past, it has been proposed to provide valves such as gate valves with back seats to permit changing of stem packing while the valve is under pressure. See U.S. Pat. Nos. 3,348,567 and 4,029,294.

In many instances, flow line control valves are provided with an actuator which is remotely controlled such as a pneumatic or hydraulic actuator. A valve of this type is illustrated in the *Composite Catalog of Oil Field Equipment and Services,* 33rd Revision, 1978–79 at page 5331. While this valve does not show a back seat it has been proposed in the past to provide a back seat in the valve with a cooperable back seat valve member to isolate the stem packing. In these instances, the pressure within the flow line has been relied upon to hold the back seat valve member in engagement with the back seat valve. See U.S. Pat. No. 3,958,592. The practice of the U.S. Pat. No. 3,958,592 cannot be relied upon to give a positive seat. When line pressure is low or if jarring should occur to the valve stem, the back seat seal could be lost allowing escape of the fluids being controlled. It will be appreciated that where dangerous gases such as hydrogen sulfide are being controlled, a positive method of holding the back seat in place while replacing the packing is needed. Further, in the event of malfunction of the return mechanism, such as by spring 46 in the U.S. Pat. No. 3,958,592 breaking, it is desirable to have an auxiliary means for moving the valve to closed position.

It is an object of this invention to provide a valve with a back seat seal which is positively energized by a pressure fluid other than the fluid being controlled by the valve.

Another object is to provide an auxiliary piston for positively holding a back seat valve on its seat in which the auxiliary piston does not reciprocate with normal movement of the valve member thus protecting the seal system of the auxiliary piston.

Another object is to provide a valve with a fluid operated back seat closure system with testing systems so that malfunctions may be detected and the stem packing may be replaced with complete safety.

Other objects, features and advantages of the invention will be apparent from the drawing, the specification and the claims.

Figure 2:
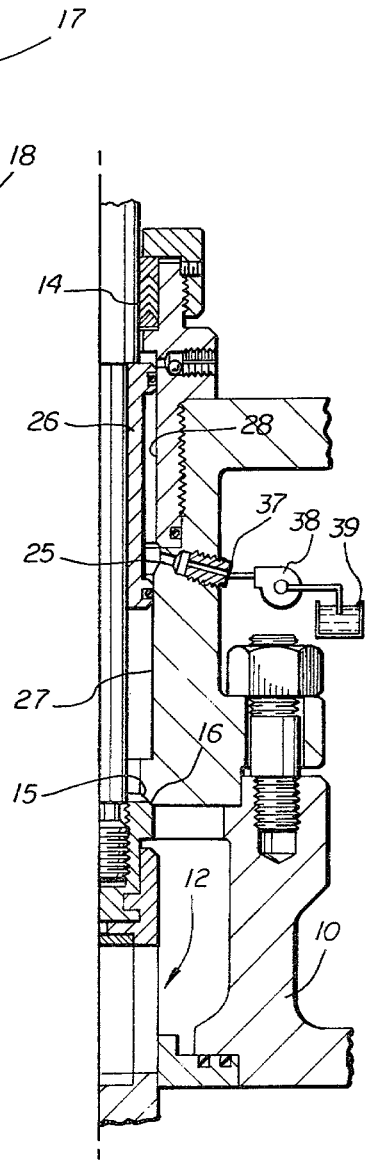

In the drawing wherein an illustrative embodiment of this invention is shown and wherein like parts are indicated by like numerals:

FIG. 1 is a view in quarter-section through a gate valve constructed in accordance with this invention but with the lower portion of the gate valve omitted; and FIG. 2 is a fragmentary view similar to FIG. 1 showing the back seat valve held on its seat by the auxiliary system.

The valve includes a valve body, a portion of which is shown at 10. As the valve body and the valve member are conventional in form, only a portion thereof have been shown. It will be appreciated that the valve body and the valve member may take the form shown in the valve disclosed on page 5331 of the above-identified Composite Catalog.

A bonnet 11 is mounted on the valve body 10.

Within the valve body and bonnet a valve member assembly is provided. This assembly includes a valve member indicated generally at 12 and a valve stem 13. The assembly is movable between open and closed positions to open and close the valve.

Seal means indicated generally at 14 is provided between the bonnet and the valve stem. This seal means may be the conventional V-type packing shown.

In order to provide for replacement of this seal 14, means are provided for temporarily protecting the area of the seal from pressure within the valve.

The protective means includes a back seat 15 which is preferably at the lower end of the bonnet 11. The protective means also includes a back seat valve member 16 on the valve member assembly which, when the assembly is raised to its full up position, engages the seat 15 and isolates the bonnet and the seal 14 from pressure within the valve body 10.

Mounted on the bonnet 11 is an actuator for moving the valve assembly. The actuator may be mechanical or fluid operated. In the illustrated embodiment a fluid actuator indicated generally at 17 is shown for moving the valve assembly between its normal open and closed positions. This assembly includes the housing 18 in which the piston 19 is reciprocal. A suitable seal 21 on the piston 19 cooperates with the housing 18 and the piston 19 to provide a fluid chamber 22. Fluid access is provided to this chamber through the inlet 23 and fluid pressure, pneumatic pressure in the design shown, is supplied to chamber 22 to move the valve operator 19 downwardly. While the valve may be designed to be open or closed in the down position, the illustrated embodiment is designed to have the valve open when pressure is supplied through the inlet 23 to the chamber 22. Thus, in the event of any failure of the pneumatic system, the valve will automatically move to closed position and thus fail safe.

The means for moving the valve member assembly between open and closed positions includes the spring 24 and valve pressure on lower stem 13 area at seal 14 which, when fluid pressure is reduced in chamber 22 is effective to move the valve member assembly upward and position the valve member in valve closed position.

In accordance with this invention, a pressure chamber is provided in the bonnet at 25. This pressure chamber includes an auxiliary piston 26 for moving the valve member assembly to a position seating the back pressure valve member 16 on the back seat 15.

The back pressure chamber and auxiliary piston may take any desired form. A separate sleeve-type auxiliary piston 26 is preferred. In this preferred form, the bonnet is provided with a small diameter polished bore 27 and a large diameter polished bore 28. The sleeve piston 26 has a lower seal such as O-ring 29 sealing between the sleeve and the lower polished bore. The upper section of the sleeve 26 is provided with a boss 26a and a seal such as O-ring 31 seals between the boss and the large diameter polished bore 28.

Where the preferred sleeve is utilized, the valve stem is provided with a stop such as shoulder 32 for engagement by the sleeve 26. Line pressure will pass shoulder 32 and be effective on packing 14. Thus, the introduction of pressure fluid into the chamber 25 is effective against the pressure responsive area provided by the difference between the two polished bores 27 and 28 to move the auxiliary piston away from the back seat 15 to lift the valve assembly into a position in which the back seat valve member 16 engages the back seat 15. As an auxiliary source of fluid is utilized, a substantial force may be applied to the valve member assembly which will provide a positive seal and contain the pressure within the valve body even under adverse conditions in which shock is applied to the valve stem, trash is caught between the back seat and back seat valve member and the like. As an auxiliary pressure source is utilized, it is not dependent upon the pressure within the valve body and the back seat valve may be forced against the back seat with the force desired.

A port 33 is provided for the introduction of the auxiliary fluid into chamber 25.

Preferably, a velocity check valve indicated generally at 30 is provided in this port during normal operation of the valve. Thus, if there is any leakage past the seals 29 and 31, this leakage will be apparent at the velocity check valve. On the other hand, if for some reason one of the seals fails the velocity check valve will seat and contain the pressure within the system.

In the upper portion of the bonnet, a bleed valve including a bleed plug 34 having a bleed slot 34a therein and a ball 35 is provided. The plug 34 holds ball 35 on its seat. Backing off of the plug 34 releases the pressure holding the ball on its seat and any pressure behind the ball will bleed through the slot 34a to relieve the pressure within the bonnet 11.

Another bleed valve 36 identical to that just described is provided in the bonnet. This valve opens into the polished bore 27 at a point remote from the port 33 to permit testing of the chamber 25 before removal of the velocity valve 30.

As shown in FIG. 2, after the velocity valve 30 has been removed, a suitable fitting 37 is connected in port 33 and a pump 38 may withdraw fluid, preferably hydraulic, from container 39 to pressurize the chamber 25.

In normal operation of the valve pneumatic fluid is supplied to chamber 22 to maintain the valve in open position. When it is desired to close the valve this fluid is exhausted from the chamber 22 permitting spring 24 and valve pressure on lower stem 13 area at seal 14 to move the valve to closed position. As line pressure is effective on the two seals 29 and 31 line pressure will prevent reciprocation of the piston 26 with the valve assembly by urging the piston toward the back seat.

When it is desired to change the stem packing 14 or if a malfunction of spring 24 occurs the auxiliary system is utilized to seat the back seat valve member 16 on its seat 15. As this coincides with the closed position of the valve this also closes the main valve.

Prior to removing the velocity valve 30 it is desirable to be certain that chamber 25 is not pressurized. If substantial pressure were present in this chamber then the force present against the velocity valve might result in injury or damage as it is removed from the bonnet. For this purpose the bleed valve 36 is provided and by first backing off on the bleed valve 36 to relieve the pressure on the ball, the chamber can be tested to make certain that it is not under pressure.

After the chamber 25 is vented the velocity valve 30 can be removed and the fitting 37 inserted into the bonnet in its place. Pump 38 is then activated to pressurize the chamber 25 with hydraulic fluid and lift the auxiliary piston 26 to the position shown in FIG. 2. The pressure being exerted by the pump 38 may be maintained on the system by a suitable back pressure valve, not shown, or by a continuously operating pump with suitable controls so that the outlet of the pump is maintained at a desired pressure.

At this time the fluid actuator may be disassembled to provide access to the packing 14. It is desirable to be certain that there is no pressure trapped behind the packing 14. If the packing has been leaking the pressure will normally be relieved by the packing 14 after the back pressure valve is seated. If it is not relieved or if the packing is changed at periodic intervals to avoid any possibility of leaking, then the bleed valve plug 34 is backed off to relieve the pressure on ball 35 and vent pressure within the bonnet 11. At this time the nut 41 may be removed to provide access to packing 14 which may be changed while the back seat valve is positively held on its seat and all pressure below the packing has been vented to atmosphere.

After the actuator is reassembled with the bleed valve 34-35 closed the auxiliary pressure system may be removed. If desired, bleed valve 36 may be opened to relieve pressure in chamber 25 or the pressure may be relieved through removal of the auxiliary pressure system. The valve is then opened and the velocity valve reinstalled.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A valve comprising,
   a valve body,
   a bonnet on said valve body,
   a valve member assembly including a valve member and valve stem in said body and bonnet movable between open and closed positions,
   seal means between said bonnet and valve stem,
   a back seat in said bonnet,
   said valve member assembly including a back valve member cooperable with said back seat and when seated isolating said seal means from pressure fluid within the valve body,
   means for moving said valve member assembly between open and closed positions,
   a pressure chamber including an auxiliary piston means for moving said valve member assembly to a position seating said back valve member on said valve back seat, and
   a port providing access to said pressure chamber from the exterior of the valve for pressurization of said pressure chamber from an auxiliary source whereby when said pressure chamber is pressurized said auxiliary piston means maintains said back valve member against said back seat and isolates pressure fluid within the valve body permitting repair of portions of said valve on the side of the back valve member remote from said valve member.

2. The valve of claim 1 wherein said auxiliary piston means is provided by a sleeve cooperable with a shoulder on the valve stem permitting the stem to reciprocate during normal use of the valve without movement of the auxiliary piston means.

3. The valve of claim 2 wherein pressure in the bonnet urges said auxiliary piston means towards said back seat and prevents movement of the auxiliary piston means during normal operation of the valve.

4. The valve of claims 1, 2 or 3 wherein a velocity valve controls flow of fluid through said port during normal operation of said valve.

5. The valve of claims 1, 2, 3 or 4 wherein bleed valves control flow from said pressure chamber and said bonnet to vent pressure fluid from said chamber prior to removing said velocity valve and to vent pressure fluid from the bonnet prior to removing said seal means.

6. The valve of claims 1, 2, 3, 4 or 5 wherein the back seat and back valve member when engaged isolates the valve body from the seal means and said auxiliary piston means.

* * * * *